(12) United States Patent
Fujimoto et al.

(10) Patent No.: US 7,156,569 B1
(45) Date of Patent: *Jan. 2, 2007

(54) WALL-MOUNTING IMAGE PROCESSING APPARATUS

(75) Inventors: Hisayoshi Fujimoto, Kyoto (JP); Hiroaki Onishi, Kyoto (JP); Toshihiko Takakura, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/743,678

(22) PCT Filed: Jul. 8, 1999

(86) PCT No.: PCT/JP99/03716

§ 371 (c)(1),
(2), (4) Date: Jan. 12, 2001

(87) PCT Pub. No.: WO00/03536

PCT Pub. Date: Jan. 20, 2000

(30) Foreign Application Priority Data

Jul. 13, 1998 (JP) .................................. 10-197333
Nov. 19, 1998 (JP) .................................. 10-329011

(51) Int. Cl.
*B41J 29/00* (2006.01)
*H04N 1/024* (2006.01)

(52) U.S. Cl. ........................................ 400/693; 358/472
(58) Field of Classification Search ...................... None
See application file for complete search history.

(56) References Cited

U.S. PATENT DOCUMENTS 5,570,122 A * 10/1996 Imamura et al. ............ 347/171

| | | | |
|---|---|---|---|
| 6,222,581 B1 | 4/2001 | Fujimoto et al. | ........... 347/256 |
| 6,947,184 B1 * | 9/2005 | Onishi et al. | ............... 358/472 |
| 6,952,273 B1 * | 10/2005 | Fujimoto et al. | ............ 358/1.1 |
| 6,952,289 B1 * | 10/2005 | Fujimoto et al. | ........... 358/472 |

FOREIGN PATENT DOCUMENTS

| | | |
|---|---|---|
| EP | 0 917 341 | 12/2003 |
| JP | 4-282952 | 10/1992 |
| JP | 05344261 A * | 12/1993 |
| JP | 6-70090 | 3/1994 |
| JP | 6-86004 | 3/1994 |
| JP | 6-113069 | 4/1994 |
| JP | 9-284470 | 10/1997 |
| JP | 10-51587 | 2/1998 |
| WO | WO98/05158 | 2/1998 |

OTHER PUBLICATIONS

Supplementary European Search Report Dated Nov. 24, 2004.

* cited by examiner

*Primary Examiner*—Daniel J. Colilla
(74) *Attorney, Agent, or Firm*—Michael Bednarek; Paul, Hastings, Janofsky & Walker LLP (57) ABSTRACT

A wall-mounting image processing apparatus (A) includes a machine housing (90) mounted on a substantially vertical wall surface (H), and an image reading/writing head (X) disposed in the machine housing. The image reading/writing head (X) includes a substrate (4) having one surface (4A) on which a plurality of light receiving elements (4a) are arranged in a row. Part of said one surface (4A) forms an excess surface (49) projecting laterally from a head case (1), and the printing elements (4b) are arranged on the excess surface (49).

16 Claims, 11 Drawing Sheets

WALL-MOUNTING IMAGE PROCESSING APPARATUS

TECHNICAL FIELD

The present invention relates to a wall-mounting image processing apparatus which, in use, is mounted on a wall surface of a house for example. More particularly, the present invention relates to a wall-mounting image processing apparatus having both an image reading function and an image printing function.

BACKGROUND ART

An example of image processing apparatus is a wall-mounting facsimile machine, which, in use, is mounted on a wall surface of a house. In use of such a wall-mounting facsimile machine, it is desired that the facsimile machine does not project greatly from the wall surface. Accordingly, there is a higher need for overall thickness reduction with respect to a wall-mounting facsimile machine than other type of facsimile machine used on a table or desk.

Figure 11:
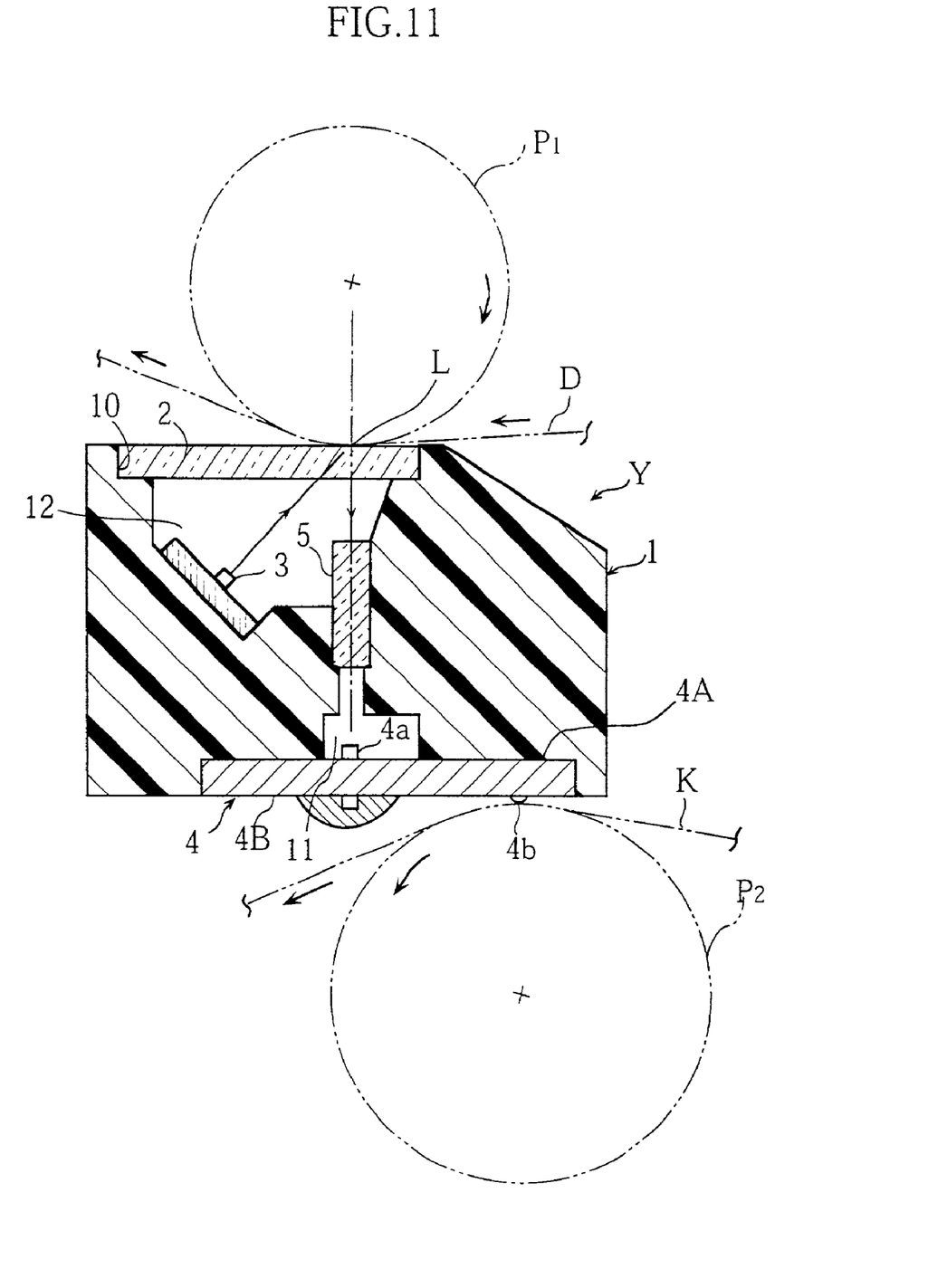
FIG. 11 is a sectional view showing an example of prior art image reading/writing head.

A prior art facsimile machine has the structure as shown in FIG. 11, for example, in which an image reading/writing head is accommodated in a machine housing. The illustrated image reading/writing head Y includes a head case 1 and a transparent cover 2 mounted on one side of the head case. The head case 1 accommodates light sources 3 for illuminating an image reading line L defined on the transparent cover 2, and lenses 5 for forming an image of a document. A substrate 4 is mounted on the other side of the head case 1. The substrate 4 has an obverse surface 4A and a reverse surface 4B which are provided with a plurality of light receiving elements 4a and a plurality of heat generating elements 4b, respectively. The light receiving elements and the heat generating elements are arranged in respective rows extending longitudinally of the substrate 4.

In the facsimile machine provided with the image reading/writing head Y having the above-described structure, a document D is transferred by a platen roller $P_1$ in close contact with the transparent cover 2. During the transferring step, the document D is illuminated by the light sources 3. The light reflected by the document D is collected by the lenses 5, thereby forming an image of the document D on the light receiving elements 4a, which output image signals. On the other hand, a recording paper K of heat-sensitive type is transferred by a platen roller $P_2$ in close contact with the heat generating elements 4b. During the transferring step, selected ones of the heat generating elements 4b generate heat, thereby printing an image on the recording paper K. The facsimile machine having the above-described structure can be made smaller in thickness than a facsimile machine in which a reading head and a printing head are separately provided.

However, in the above-described facsimile machine, the platen rollers $P_1$, $P_2$ are disposed so as to sandwich the image reading/writing head Y, so that the platen rollers $P_1$ and $P_2$ are bulky in the thickness direction of the image reading/writing head Y. Therefore, in the prior art described above, it is not possible to sufficiently reduce the thickness of the wall-mounting image processing apparatus. As a result, when apparatus is mounted, in use, on a wall surface, the apparatus projects greatly from the wall surface.

DISCLOSURE OF THE INVENTION

It is an object of the present invention to provide a wall-mounting image processing apparatus which eliminates or reduces problems of the prior art described above.

In accordance with the present invention, there is provided a wall-mounting image processing apparatus comprising a machine housing mounted on a substantially vertical wall surface, and an image reading/writing head disposed in the machine housing. The image reading/writing head includes a substrate having one surface on which a plurality of light receiving elements are arranged in a row; a head case mounted on said one surface of the substrate to surround the plurality of light receiving elements; a transparent cover mounted to the head case and spaced from the substrate in facing relation thereto, a document being transferred in contact with the cover; a light source disposed in the head case for illuminating the document; a plurality of lens arranged in the head case for forming, on the plurality of light receiving elements, an image of the document illuminated by the light source; and a plurality of printing elements mounted on the substrate in a row extending in the same direction as the row of light receiving elements. Part of said one surface of the substrate forms an excess surface projecting laterally from the head case, and the printing elements are arranged on the excess surface.

In such a wall-mounting image processing apparatus, the document platen roller for transferring a document in contact with the transparent cover and the recording paper platen roller for transferring a recording paper in contact with the printing elements are disposed on the same side of the substrate. Unlike the prior art, it is not necessary to arrange the document platen roller and the recording paper platen roller so as to sandwich the entirety of the image reading/writing head. This prevents the two platen rollers from being bulky in the thickness direction of the image reading/writing head, so that it is possible to reduce the thickness of the wall-mounting image processing apparatus.

Preferably, the transparent cover may be so inclined that the spacing from the substrate increases toward the excess surface.

With such a structure, in arranging the document platen roller in facing relation to the transparent cover, it is possible to locate the document platen roller close to the substrate, while keeping a suitable distance from the recording paper platen roller. Therefore, it is possible to prevent the document transfer path and the recording paper transfer path from interfering with each other while also realizing thickness reduction of the wall-mounting image processing apparatus.

Preferably, the head case has an outer side surface rising from said one surface of the substrate, and at least part of the outer side surface is so inclined with respect to the substrate that it becomes farther from the excess surface as it rises from the substrate.

With such a structure, the transparent cover is located relatively far away from the excess surface as a result of the inclination of the outer side surface of the head case. Therefore, it is possible to keep a suitable distance between the document platen roller and the recording paper platen roller, so that the document transfer path and the recording paper transfer path can be appropriately provided. Moreover, since the outer side surface is inclined, the recording paper platen roller can be disposed relatively close to the outer side surface of the head case but so as not to interfere with the outer side surface.

Preferably, the plurality of lenses are inclined with respect to the substrate to be progressively farther from the excess surface as they extend toward the transparent cover.

A portion on the transparent cover positionally corresponding to the plurality of lenses serves as an image reading line. Therefore, with the above-described structure, the image reading line is defined at a position relatively far away from the excess surface. Since the document platen roller is disposed in facing relation to the image reading line, the above structure is also advantageous for keeping a suitable distance between the document platen roller and the recording paper platen roller. Moreover, by the inclination of the lenses, it is possible to increase the distance between the image reading line and the light receiving elements (i.e. the length of light path of the light reflected on the document) without increasing the thickness of the head case. As a result, the depth of focus of the lenses can be increased, which leads to enhanced image reading quality.

Preferably, each of the printing elements may be a heat generating element, and the apparatus may further comprise a heat sink plate laid on a surface of the substrate opposite to said one surface.

With this structure, it is possible to perform printing thermosensitively or by thermal transfer. Moreover, by the heat dissipating operation of the heat sink plate, it is possible to keep the temperature of the heat generating elements suitable for image printing.

Preferably, the machine housing is provided with an engagement portion engageable with a catch member fixedly mounted on the wall surface.

With such a structure, it is possible to easily mount the wall-mounting image processing apparatus on the wall surface by bringing the engagement portion into engagement with the catch member.

Preferably, the machine housing may include a front portion provided with at least one discharge port for discharging the document and a recording paper out of the machine housing as well as a plurality of operation switches. The plurality of operation switches may be positioned above the discharge port when the machine housing is mounted to the wall surface.

When the wall-mounting image processing apparatus is mounted, in use, on a wall surface, the document or the recording paper discharged through the corresponding discharge port hangs down under its own weight. With the above-described structure, however, it is possible to prevent the operation switches from being covered by the document or the recording paper.

Preferably, the machine housing may be integrally provided with a receiving portion for a recording paper, and the receiving portion is offset in the machine housing to be located below a vertically central portion of the machine housing when the machine housing is mounted to the wall surface.

With such a structure, when the wall-mounting image processing apparatus is mounted, in use, on a wall surface, the center of gravity of the apparatus is located at a lower portion within the machine housing. Therefore, the wall-mounting image processing apparatus can be mounted with stability.

Preferably, the machine housing may comprise a main body integrally accommodating the image reading/writing head and having a front portion provided at least partially with an opening, and at least one cover for openably closing said opening. The cover may be provided with a plurality of platen rollers for the document and the recording paper, whereby the plurality of platen rollers are opposed to the transparent cover and the plurality of printing elements, respectively, when the cover is closed.

With such a structure, the platen rollers for the document and the recording paper can be easily set in the apparatus. When the document or the recording paper is jammed, the cover is opened to move the document platen roller far away from the transparent cover or to move the recording paper platen roller far away from the printing elements. Therefore, it is possible to easily remove the jammed document or recording paper out of the machine housing.

Preferably, the cover may comprise a first lid which is provided with a platen roller for the document, and a second lid which is provided with a platen roller for the recording paper, and the machine housing internally provides a document transfer path covered by the first lid and a recording paper transfer path covered by the second lid.

With such a structure, when a paper jam occurs in the document transfer path or the recording paper transfer path, it is possible to individually open the first lid or the second lid.

Preferably, the machine housing may comprise a document inserting port which is positioned above the transparent cover of the image reading/writing head when the machine housing is mounted to the wall surface, and a recording paper receiving portion which is positioned below the plurality of printing elements of the image reading/writing head when the machine housing is mounted to the wall surface.

With such a structure, it is possible to appropriately provide a document transfer path extending from the document inserting port to the image reading/writing head and a recording paper transfer path extending from the recording paper receiving portion to the image reading/writing head without increasing the thickness of the image reading/writing head X.

Preferably, a gap may be formed between the first lid and the second lid, and the gap serves as a common discharge port for the document and the recording paper.

With such a structure, it is sufficient to provide a single discharge port for the document and the recording paper. Further, the discharge port can be easily formed by utilizing the first lid and the second lid.

Preferably, the discharge port is provided with a cutting edge for the recording paper.

With such a structure, the recording paper discharged through the discharge port can be cut by the cutting edge, which is convenient.

Preferably, the cutting edge may be formed at one side of the first lid which is oriented downward when the machine housing is mounted to the the wall surface.

With such a structure, when the wall-mounting image processing apparatus is mounted, in use, on a wall and the recording paper discharged through the discharge port is cut, it is possible to press a part of the recording paper below the cutting edge with fingertips. Therefore, the cutting operation can be appropriately performed.

Preferably, the cutting edge may extend short of longitudinally opposite ends of said one side of the first lid.

With such a structure, the opening and the closing of the first lid can be appropriately performed by gripping the first lid at portions where the cutting edge is not provided.

Preferably, the image reading/writing head may be provided with a stopper which engages with a shaft of the recording paper platen roller when the second lid is closed.

With such a structure, it is possible to precisely define the positional relationship between the recording paper platen roller and the image reading/writing head.

Other features and advantages of the present invention will become clearer from the detailed description given below with reference to the accompanying drawings.

BEST MODE FOR CARRYING OUT THE INVENTION

Preferred embodiments of the present invention will be described below with reference to the accompanying drawings.

FIGS. 1 through 4 illustrate a first embodiment of the present invention. In these figures, the elements which are identical or similar to those of the prior art are designated by the same reference signs as those used for the prior art.

Figure 2:
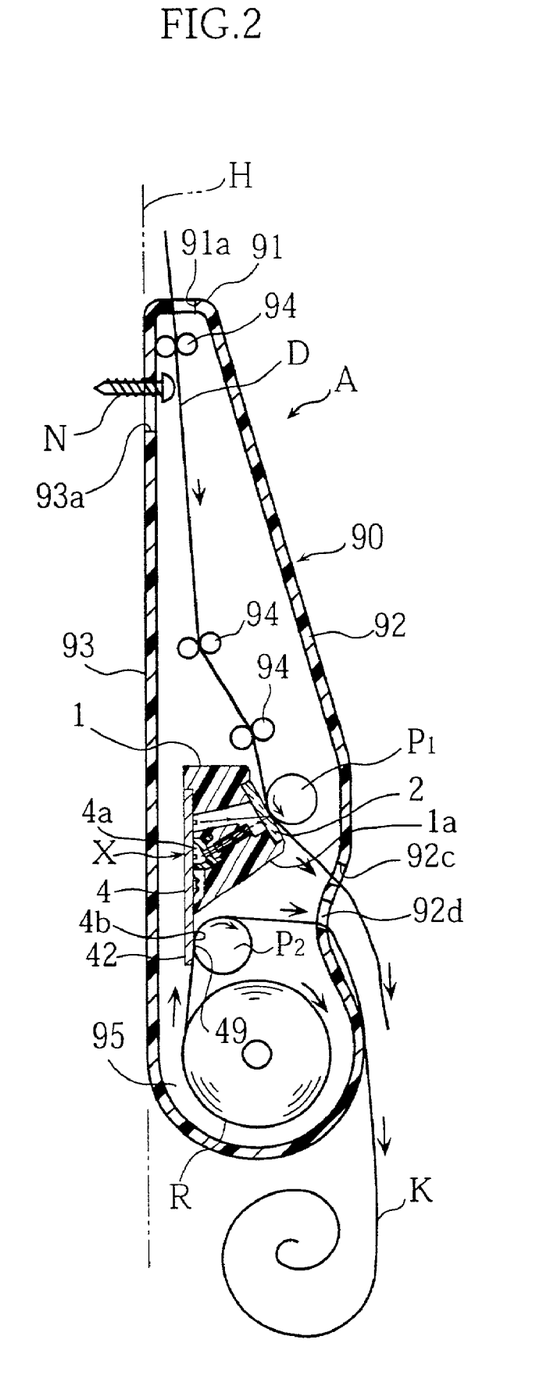
FIG. 2 is a sectional view taken along lines II—II in FIG. 1.

Referring to FIG. 2, a wall-mounting image processing apparatus A in accordance with the first embodiment comprises a machine housing 90, an image reading/writing head X disposed in the machine housing 90, a platen roller $P_1$ for a document and a platen roller $P_2$ for a recording paper.

Figure 3:
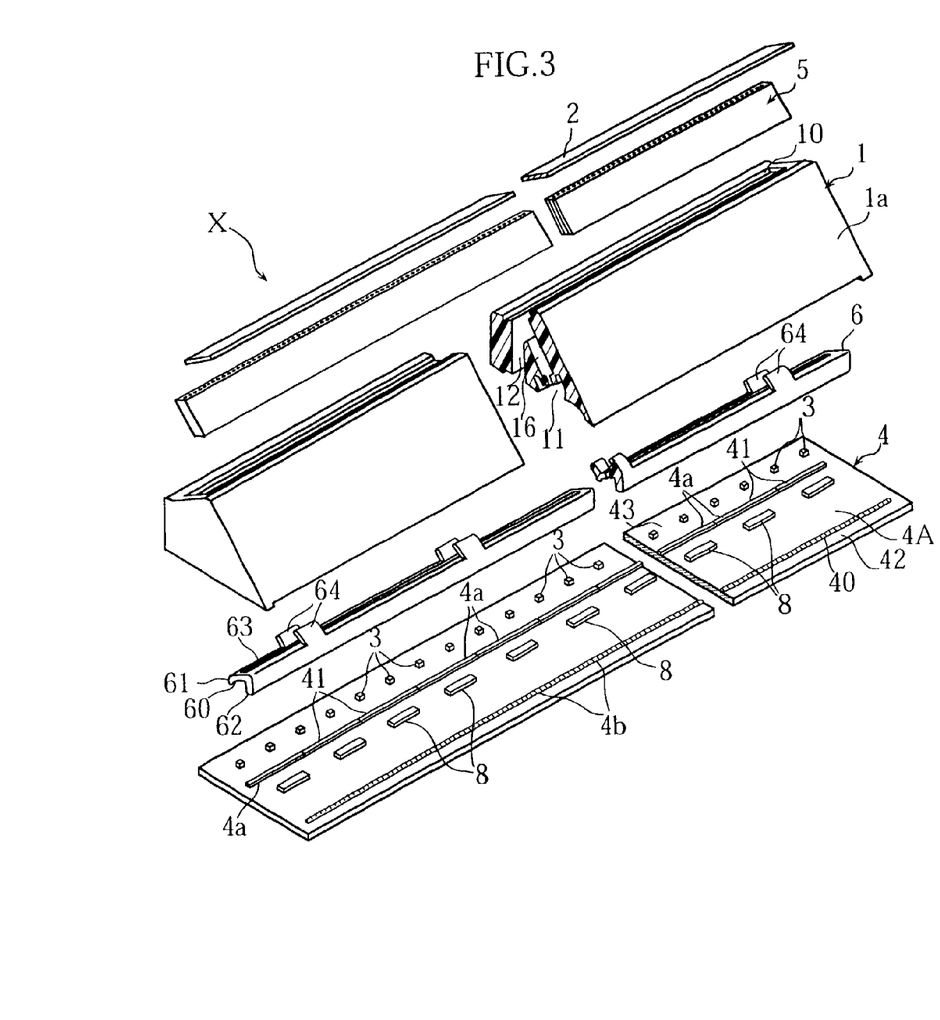
FIG. 3 is an exploded perspective view of an image reading/writing head used in the wall-mounting image processing apparatus shown in FIG. 1.

As clearly shown in FIGS. 3 and 4, the image reading/writing head X comprises a head case 1, a transparent cover 2, a lens array 5, a reflection preventing member 6, a substrate 4 and other parts which will be described below.

The substrate 4, which may be made of ceramic material for example, is in the form of an elongated rectangular plate. The substrate 4 has an obverse surface (one surface) 4A which is provided with a plurality of light sources 3, a plurality of image sensor chips 41, a plurality of drive ICs 8 and a plurality of heat generating elements 4b.

The plurality of light sources 3, each of which may comprise an LED chip, are arranged on the substrate 4 at a predetermined pitch in a row extending longitudinally of the substrate. For performing color image reading, the light sources 3 need to emit red light, green light and blue light, or white light. Each of the image sensor chips 41 is a semiconductor chip having a light receiving element 4a integrally formed therein for performing a photo-electric conversion. The image sensor chips are arranged in a row extending substantially parallel to the row of the light sources 3.

The heat generating elements 4b serves as printing elements. The heat generating elements 4b may be provided by printing and baking thick resistor paste containing, for example, ruthenium oxide as conductive substance to form a linear heating resistor 40 extending longitudinally of the substrate 4, and then providing a wiring pattern to electrically separate the heating resistor 40 longitudinally at a predetermined pitch. The drive ICs 8 function to control the heating operation of the heat generating elements 4b. Similarly to the light sources 3, the drive ICs are arranged at a predetermined pitch in a row extending longitudinally of the substrate 4.

The row of heat generating elements 4b is disposed on the substrate 4 at a portion which is offset widthwise toward a first longitudinal side 42 of the substrate 4, whereas the rows of the driving ICs 8, the light receiving elements 4a and the light sources 3, respectively, are disposed at a portion which is widthwise closer to a second longitudinal side 43 of the substrate 4 than the row of heat generating elements 4b. The obverse surface 4a of the substrate 4 is formed with wiring patterns (not shown) respectively connected to the above-described components mounted thereon. The substrate 4 is also provided with at least one connector (not shown) which is electrically connected to each of the wiring patterns. By connecting an external device to the connector by wiring, it is possible to supply power from the external device to the above-described components while performing input/output of various signals to and from the components.

The head case 1 may be made of white synthetic resin prepared by adding titanium oxide to polycarbonate for example. The head case has a length which is substantially equal to that of the substrate 4. The head case 1 is mounted on the surface 4A of the substrate 4 at a portion which avoids the heat generating elements 4b. As a result, the obverse surface 4A of the substrate 4 projects laterally outwardly from the head case 1 at a portion near the first longitudinal side 42, thereby forming an excess surface 49. The head case 1 may be mounted on the substrate 4 by bringing the case 1 into engagement with the substrate 4, by clamping these components with a spring clip, or by bonding these components with adhesive, for example.

The transparent cover 2 is provided to guide a document D to be read. The transparent cover comprises a plate formed of glass material or synthetic resin. The head case 1 is formed with a recess 10 into which the transparent cover 2 is fitted as spaced away from the substrate 4. The transparent cover 2 is so inclined, relative to the substrate 4, that the spacing from the substrate 4 increases toward the first longitudinal side 42 of the substrate 4. The head case 1 has an outer side surface 1a rising from the obverse surface 4A of the substrate 4. The outer side surface 1A is so inclined with respect to the substrate 4 that it becomes closer to the second longitudinal side 43 of the substrate 4 as it extends toward the transparent cover 2.

The lens array 5 comprises a plurality of rod lenses 51 arranged in a row and held in an elongated lens holder 50 formed of synthetic resin. By using the rod lenses 51 as image forming lenses, it is possible to form a non-inverted, non-magnified image of the document D on each of the light receiving elements 4a. However, other lenses may be employed for the present invention. The lens array 5 is fitted into a groove 16 formed in the head case 1 in facing relationship to the transparent cover 2. The lens array 5 is so inclined with respect to the substrate 4 that it becomes closer to the second longitudinal side 43 of the substrate 4 as it extends toward the transparent cover 2. A portion on the transparent cover 2 positionally corresponding to the lens array 5 serves as an image reading line L.

A first and a second light paths 12, 12a are defined in the head case 1. The first light path 12, which extends over the height of the head case 1, functions to guide light emitted from the light sources 3 to the image reading line L. The second light path 12a, which includes the groove 16, functions to guide the light reflected on the image reading line L to the light receiving elements 4a via the lens array 5. Since the head case 1 is made of white resin as described before, the head case 1 has high reflectivity, therefore, the light emitted from the light sources 3 is guided to the image reading line L while being repetitively reflected on the white wall surfaces of the first light path 12 at high reflectivity. Therefore, the image reading line L can be irradiated efficiently.

The reflection preventing member 6 may be made of synthetic resin such as polycarbonate or ABS resin containing black pigment or glass powder, for example, and has a black surface to provide high light absorption. The reflection preventing member 6 is disposed in a recess 11 formed at the bottom of the head case 1 in such a manner as to surround the image sensor chips 41. Specifically, the reflection preventing member 6 comprises an upper wall 60 located above the image sensor chips 41, and side walls 61, 62 respectively extending from the upper wall 60 toward the substrate 4 for appropriately surrounding the image sensor chips 41. The upper wall 60 is formed with a slit 63 for allowing the second light path 12a to extend therethrough.

The upper wall 60 of the reflection preventing member 6 is further formed with a plurality of projections 64 which are inserted into a plurality of deeper recesses provided in the recess 11. The reflection preventing member 6 is thus mounted to the head case 1. By surrounding the image sensor chips by the reflection preventing member 6, it is possible to prevent the light reflected on the document D from being affected by the white walls of the recess 11 and from being scattered within the reflection preventing member 6. Therefore, scattered light, which may cause noises, is prevented from reaching the light receiving elements 4a. Further, the reflection preventing member 6 also shuts light from outside the head case 1. Specifically, even when there exists a gap between the outer surface 1a of the head case 1 and the obverse surface 4A of the substrate 4 to allow progress of external light toward the light receiving elements 4a, the external light is shut by the reflection preventing member 6. Instead of providing reflection preventing member 6, light scattering and reflection around the image sensor chip 4a may be prevented by other means such as painting the inner wall of the recess 11 black or attaching a black sheet or film onto the inner walls of the recess 11.

Figure 1:
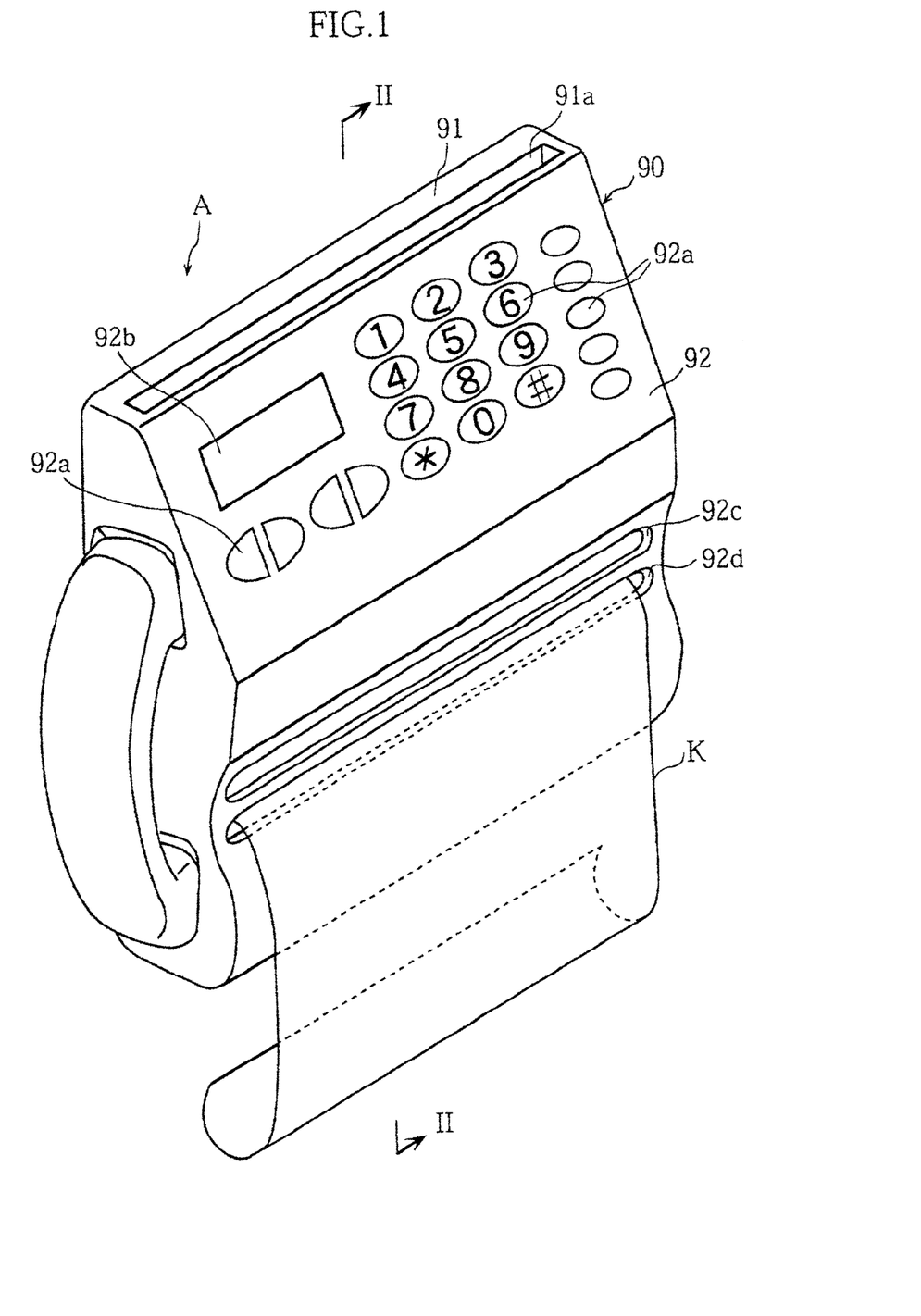
FIG. 1 is a perspective view showing a wall-mounting image processing apparatus in accordance with a first embodiment of the present invention.

As clearly shown in FIG. 1, the machine housing 90 is made of synthetic resin for example, and has an upper surface 91 formed with a document inserting port 91a extending widthwise of the machine housing 90. The machine housing 90 also includes a front surface 92 which is provided with various kinds of operation switches 92a and a display portion 92b which are arranged at an upper portion of the front surface, as well as a document discharge port 92c and a recording paper discharge port 92d which are arranged below the operation switches 92a and the display portion 92b.

As clearly shown in FIG. 2, the machine housing 90 incorporates the document platen roller $P_1$ which is disposed in facing relation to the transparent cover 2 of the image reading/writing head X. The machine housing further incorporates paper feeding rollers 94, thereby providing a document transfer path extending from the document inserting port 91a to the document discharge port 92c via the paper feeding rollers 94. The recording paper platen roller $P_2$ is incorporated in the machine housing in facing relation to the heat generating elements 4b of the image reading/writing head X. The machine housing internally provides a receiving portion 95 for receiving a roll R of elongated heat-sensitive recording paper K which is located below the recording paper platen roller $P_2$ and at the bottom of the machine housing. The area extending from the receiving portion 95 to the recording paper discharge port 92d serves as a recording paper transfer path.

Next, the operation of the wall-mounting image processing apparatus A will be described.

As clearly shown in FIG. 2, the wall-mounting image processing apparatus A is mounted, in use, on a substantially vertical wall surface H in a house for example. The wall-mounting image processing apparatus A in this embodiment is formed with a through-hole 93a at the rear surface 93 of the machine housing 90. Mounting of the image processing apparatus A onto the wall is performed by bringing a catch member, such as a screw N, fixed to the wall surface H into engagement with an edge of the through hole 93a. The edge of the through hole 93a serves as an engagement portion. However, another type of engaging portion may be employed for the present invention. Moreover, the wall-mounting image processing apparatus A may be mounted to the wall surface H by other means. For example, the machine housing 90a may be provided with a metal fitting of a suitable shape for engagement with the catch member fixed to the wall surface H.

In the wall-mounting image processing apparatus A, the document platen roller $P_1$ and the recording paper platen roller $P_2$ are disposed on the same side of the substrate 4 of the image reading/writing head X. This prevents the two platen rollers $P_1$, $P_2$ from being bulky in the thickness direction of the image reading/writing head X, so that it is possible to reduce the thickness of the wall-mounting image processing apparatus A. Moreover, since the outer side surface 1a of the head case 1 of the image reading/writing head X is inclined, it is possible to secure a relatively large space for arranging the recording paper platen roller $P_2$ at the excess surface 49. Therefore, it is possible to arrange the recording paper platen roller $P_2$ at the excess surface 49 without significantly increasing the width of the excess surface 49, thereby making the entirety of the apparatus compact.

The document platen roller $P_1$ and the recording paper platen roller $P_2$ are disposed in the machine housing 90 with similar orientation. Further, the platen rollers $P_1$ and $P_2$ are pressed against the transparent cover 2 and the heat generating elements 4b, respectively, in the same direction. Therefore, the platen rollers $P_1$, $P_2$ can be easily mounted in the machine housing 90. Moreover, the provision of the image sensor chips 41, the heat generating elements 4b and the drive ICs 8 within the reading/writing head X can be easily performed because these components are mounted on the same surface of the substrate 4. Further, since the wiring patterns need to be provided only on the obverse surface 4A of the substrate 4, it is possible to enhance productivity.

With the wall-mounting image processing apparatus A, reading of an image of a document D and printing the image on a recording paper K are carried out in the following manner.

Figure 4:
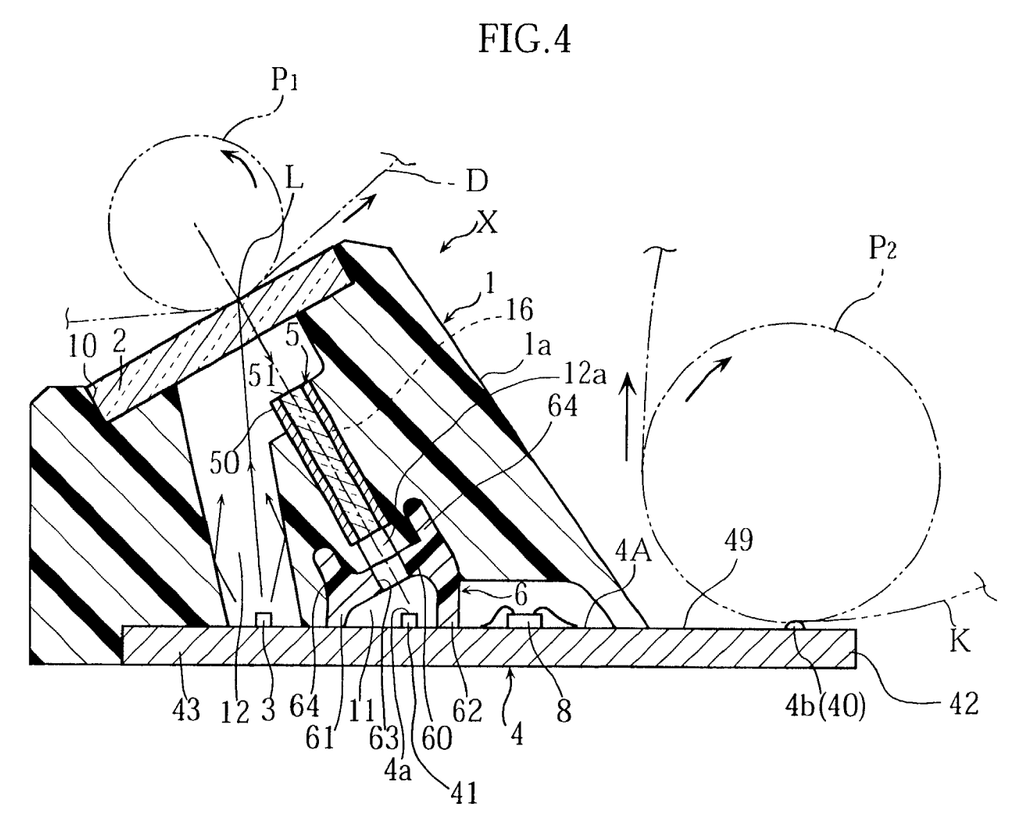
FIG. 4 is a sectional view of the image reading/writing head shown in FIG. 3.

Referring to FIGS. 2 and 4, when a document D is inserted in the document inserting port 91a, the document D is transferred, by the rotation of the paper feeding rollers 94, toward the image reading line L between the document platen roller $P_1$ and the transparent cover 2. A portion of the document D on the image reading line L is illuminated with light emitted from the light sources 3. The light reflected by the document D is collected by the lens array 5, thereby forming an image of the document D on the light receiving elements 4a. Thus, the image data corresponding to one line of the document D extending in the primary scanning direction is read, and image signals therefor are output from the light receiving elements 4a. The document D is then transferred in the secondary scanning direction by the document platen roller $P_1$. The above-described operations are repeated for each line of the document. When image reading for one page is finished, the document D is discharged outside the machine housing 90 through the document discharge port 92c.

For printing an image on a recording paper K, the recording paper K fed out from the paper roll R is transferred to between the recording paper platen roller $P_2$ and the heat generating elements 4b. Upon receiving image data, the drive ICs 8 control the heat generating elements 4b so that selected ones of the heat generating elements are energized for generating heat under power supply from outside the image reading/writing head X. Thus, an image is recorded on the recording paper K for each line. When image recording is completed, the recording paper K is discharged through the recording paper discharge port 92d to the outside.

The image reading operation and the image printing operation described above may be performed simultaneously. In such a case, the document and the recording paper need to be transferred simultaneously. With the wall-mounting image processing apparatus A, both the document D and the recording paper K can be transferred appropriately without interfering with each other. This is because, in this wall-mounting image processing apparatus A, the transparent cover 2 is located relatively far away from the recording paper platen roller $P_2$ as a result of the inclination of the outer side surface 1a of the head case 1, so that the document platen roller $P_1$ disposed on the transparent cover 2 is also located relatively far away from the recording paper platen roller $P_2$. Since the transparent cover 2 is inclined, the document platen roller $P_1$ can be located away from the recording paper platen roller $P_2$ but not largely away from the surface 4A of the substrate 4. Moreover, since the lens array 5 is inclined, the image reading line L is defined on the transparent cover 2 at a position away from the recording paper platen roller P, which also contributes to increasing the distance between the document platen roller $P_1$ and the recording paper platen roller $P_2$. Therefore, in the wall-mounting image processing apparatus A, it is possible to arrange the platen rollers $P_1$ and $P_2$ in a space efficient manner while also keeping a suitable distance between the respective centers thereof. Therefore, it is possible to prevent the document D and the recording paper K, which are respectively transferred by the platen rollers $P_1$ and $P_2$, from interfering with each other, thereby avoiding troubles caused by such interference during the image reading/printing operation, while also realizing size reduction of the wall-mounting image processing apparatus A. The document D and the recording paper K come close to each other at a portion adjacent the document discharge port 92c and the recording paper discharge port 92d. However, once the document D and the recording paper K reach this portion, they are readily guided to the respective discharge ports 92c, 92d, so that no trouble is caused even when the document D and the recording paper K come close to each other at this portion.

Each of the document D and the recording paper K discharged from the corresponding discharge port 92c or 92d hangs down at its tip end under its own weight. As a result, the operation switches 92a and the display portion 92b which are located above the discharge ports 92c, 92d are prevented from being covered with the document D and the recording paper K. Therefore, the operation of the operation switches 92a and the checking of the display portion 92b can be suitably performed even when the document D and the recording paper K are being discharged.

Figure 5:
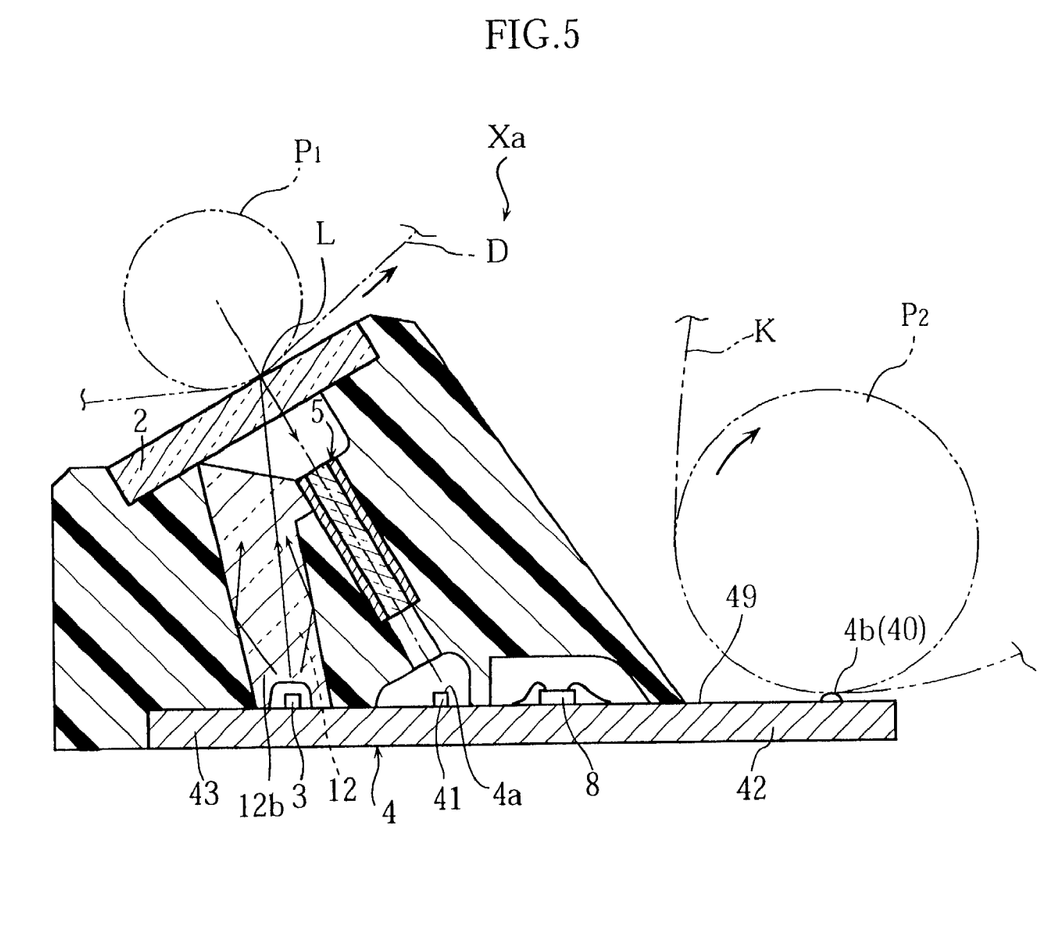
FIG. 5 is a sectional view showing an image reading/writing head in accordance with a second embodiment of the present invention.
Figure 6:
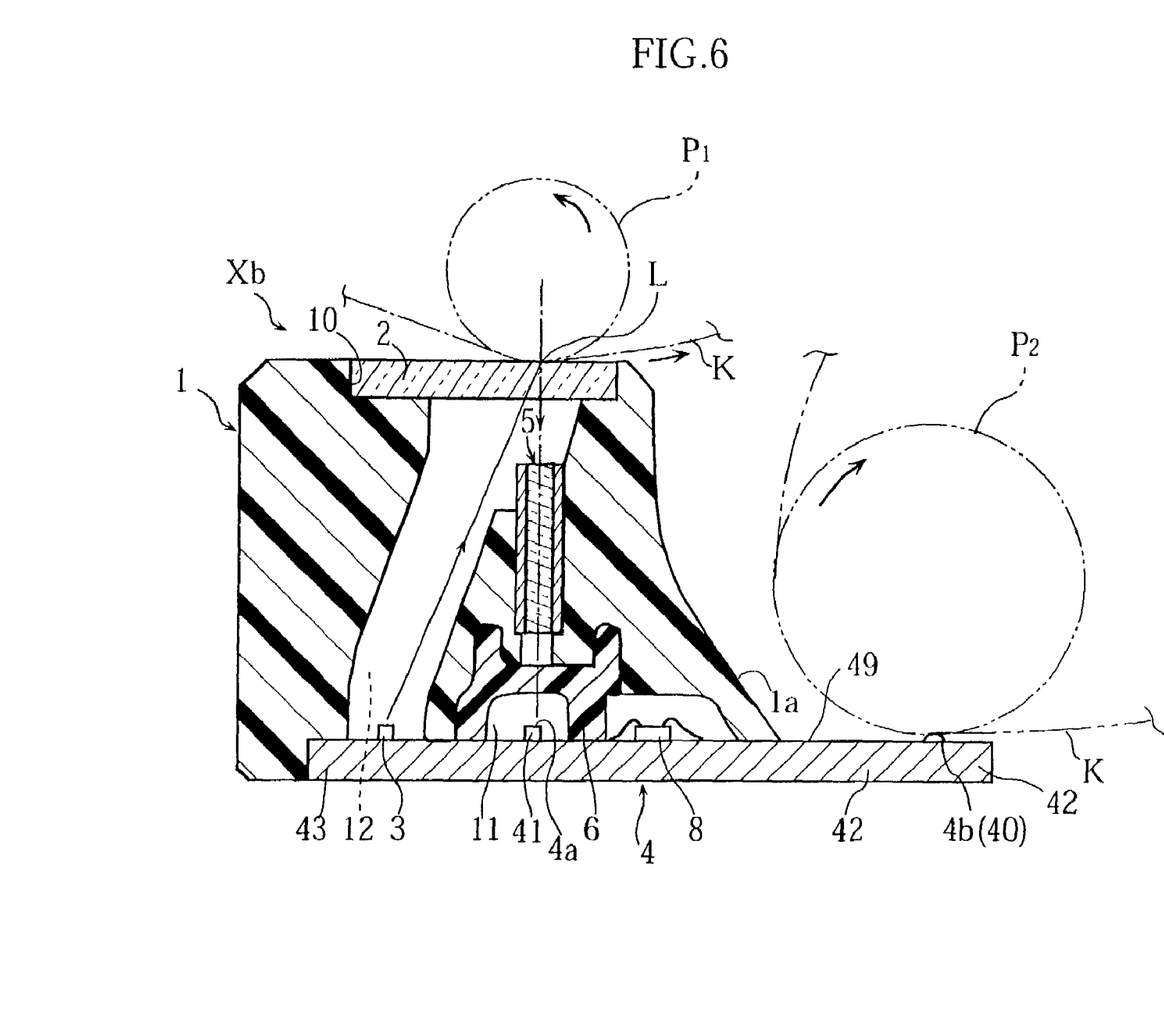
FIG. 6 is a sectional view showing an image reading/writing head in accordance with a third embodiment of the present invention.

FIGS. 5 and 6 illustrate a second and a third embodiments, respectively, of the present invention. In FIGS. 5 through 10, the elements which are identical or similar to those of the first embodiment are designated by the same reference signs as those used for the first embodiment.

FIG. 5 illustrates an image reading/writing head Xa in which a head case 1 includes an optical path 12 which is partially or entirely formed of a transparent light guide member 12b. With such a structure, light emitted from the light source 3 travels through the light guide member 12b while being totally reflected by the side surfaces of the light guide member 12b. Therefore, it is possible to guide the light to the image reading line L efficiently without the need for rendering the wall surfaces of the optical path 12 white.

FIG. 6 illustrates an image reading/writing head Xb in which a transparent cover 2 is arranged in parallel to a substrate 4. The image reading/writing head includes a head case 1 having an outer side surface 1a which is inclined, at least partially, as a rounded or a flat surface. Just by making the outer side surface 1a of the head case 1 inclined, as is in this embodiment, the transparent cover 2 mounted on the head case 1 can be located relatively close to the second longitudinal side 43 of the substrate 4. Therefore, it is possible to arrange the document platen roller $P_1$ and the recording paper platen roller $P_2$ in a space efficient manner while also keeping a suitable distance between the respective centers thereof. Also in the case where the outer side surface 1a of the case 1 is rendered perpendicular to the substrate 4 with the transparent cover 2 inclined with respect to the substrate 4, the document platen roller $P_1$ and the recording paper platen roller $P_2$ can be arranged in a space efficient manner while also keeping a suitable distance between the respective centers thereof.

FIGS. 7 through 10 illustrate a fourth embodiment of the present invention.

Figure 7:
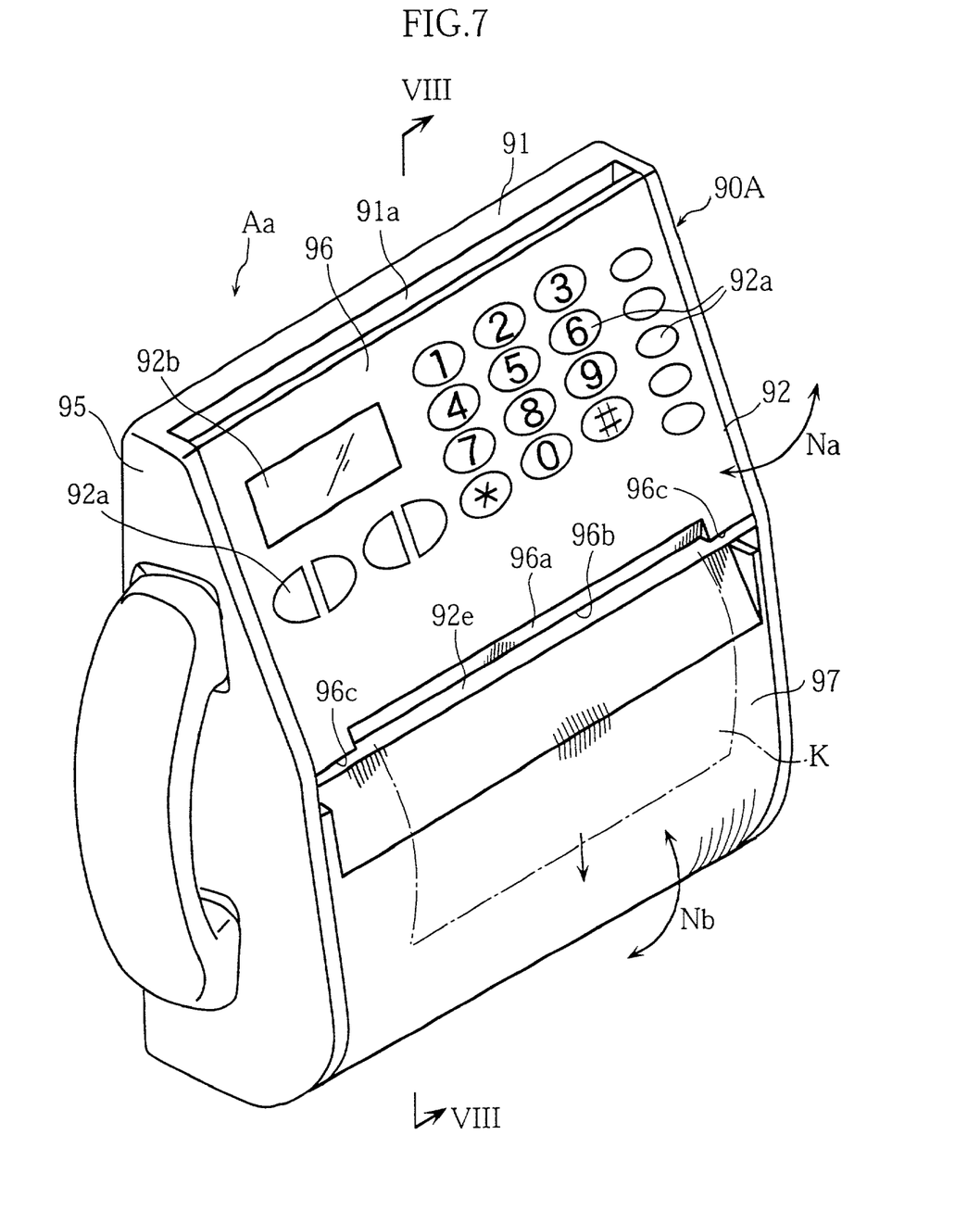
FIG. 7 is a perspective view showing a wall-mounting image processing apparatus in accordance with a fourth embodiment of the present invention.
Figure 8:
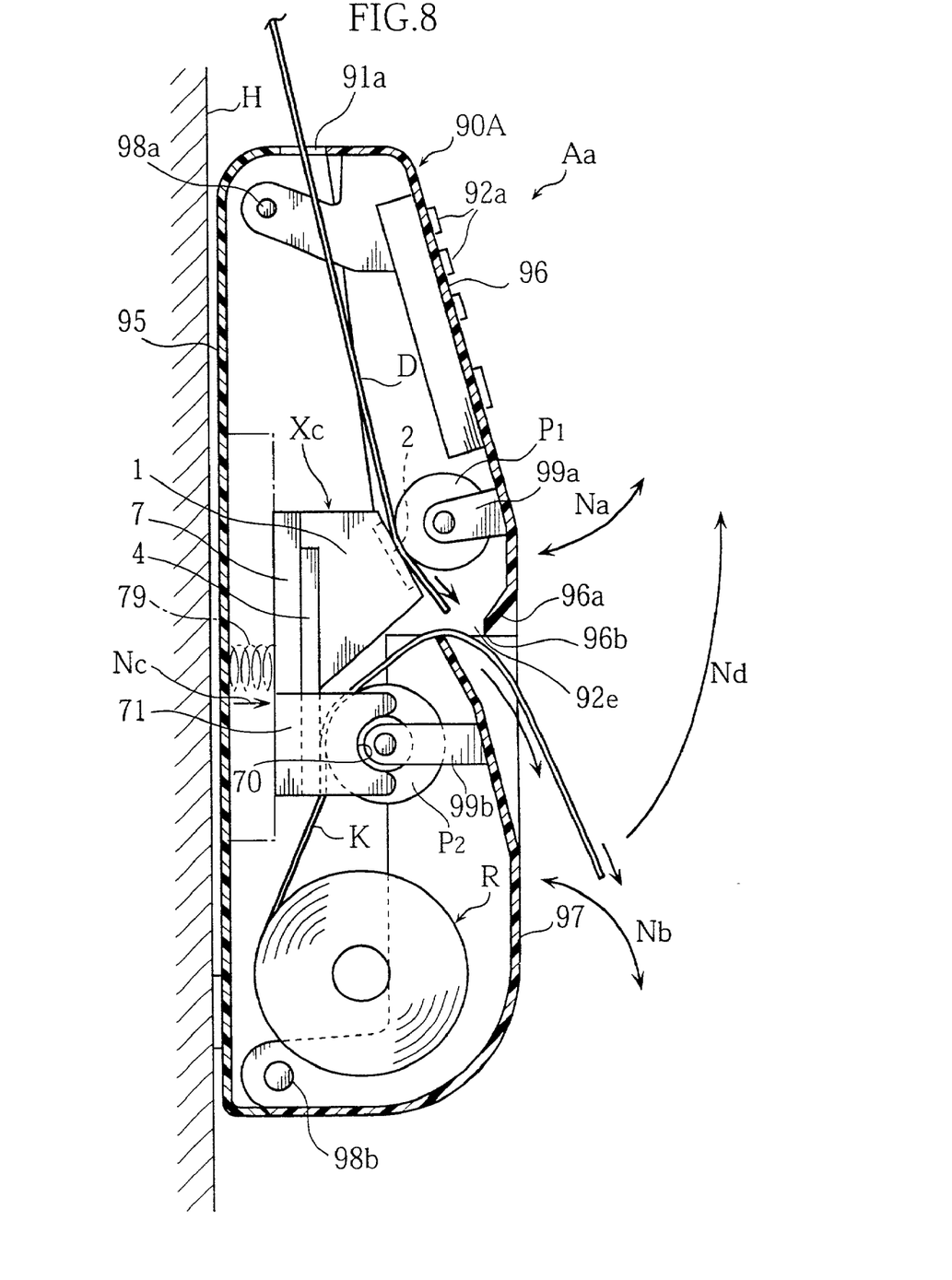
FIG. 8 is a sectional view taken along lines VIII—VIII in FIG. 7.

As clearly shown in FIGS. 7 and 8, a wall-mounting image processing apparatus Aa in the fourth embodiment includes a machine housing 90A which comprises a main body 95, a first lid 96 and a second lid 97. The main body 95 is in the form of a container having a predetermined depth and has an opening at its front side. The main body internally accommodates an image reading/writing head Xc. The first lid 96 functions to close an upper portion of the front opening of the main body 95. The first lid is supported, at its upper portion, on the main body 95 via a shaft 98a for rotation about the shaft 98a in the direction indicated by an arrow Na. The first lid 96 has an obverse surface which is provided with operation switches 92a and a display portion 92b. Between respective upper edges of the first lid 96 and the main body 95 is provided an elongated narrow clearance which serves as a document inserting port 91a. The second lid 97 functions to close a lower portion of the front opening of the main body 95. The second lid is supported, at its lower portion, on the main body 95 via a shaft 98b for rotation about the shaft 98b in the direction indicated by an arrow Nb.

The first lid 96 has a reverse surface to which a document platen roller $P_1$ is mounted via a projecting bracket 99a. The second lid 97 has a reverse surface to which a recording paper platen roller $P_2$ is mounted via a bracket 99b. The platen rollers $P_1$, $P_2$ are positionally adjusted in advance relative to the first and second lids 96, 97, respectively, so as to face the transparent cover 2 and the heat generating elements 4b, respectively, when the first and second lids 96, 97 are closed.

The first and the second lids 96, 97 are provided to define a clearance therebetween when the lids are closed. This clearance serves as a common discharge port 92e for discharging the document D and the recording paper K out of the machine housing 90A. Thus, the machine housing 90A provides, at its upper portion, a document transfer path for allowing the document D inserted through the document inserting port 91a to pass between the document platen roller $P_1$ and the transparent cover 2 before reaching the discharge port 92e. The machine housing 90A also provides, at its lower portion, a recording paper transfer path for allowing a recording paper K fed out from a paper roll R, which is disposed at a lower portion of the machine housing 90A, to pass between the recording paper platen roller $P_2$ and the heat generating elements 4b before reaching the discharge port 92e.

The first lid 96 has a downwardly directed lower marginal portion 96a which defines one of the edges of the discharge port 92e. The lower marginal portion 96a is formed with a cutting edge 96b for cutting the recording paper. As clearly shown in FIG. 7, the cutting edge 96b does not extends over the entire length of the lower marginal portion 96a. The cutting edge 96b extends short of longitudinally opposite ends 96c of the lower marginal portion and has a length greater than the width of the recording paper K. The cutting edge 96b is made sharp for appropriately cutting the recording paper K, whereas the opposite ends 96c are rounded at the respective tips.

Figure 10:
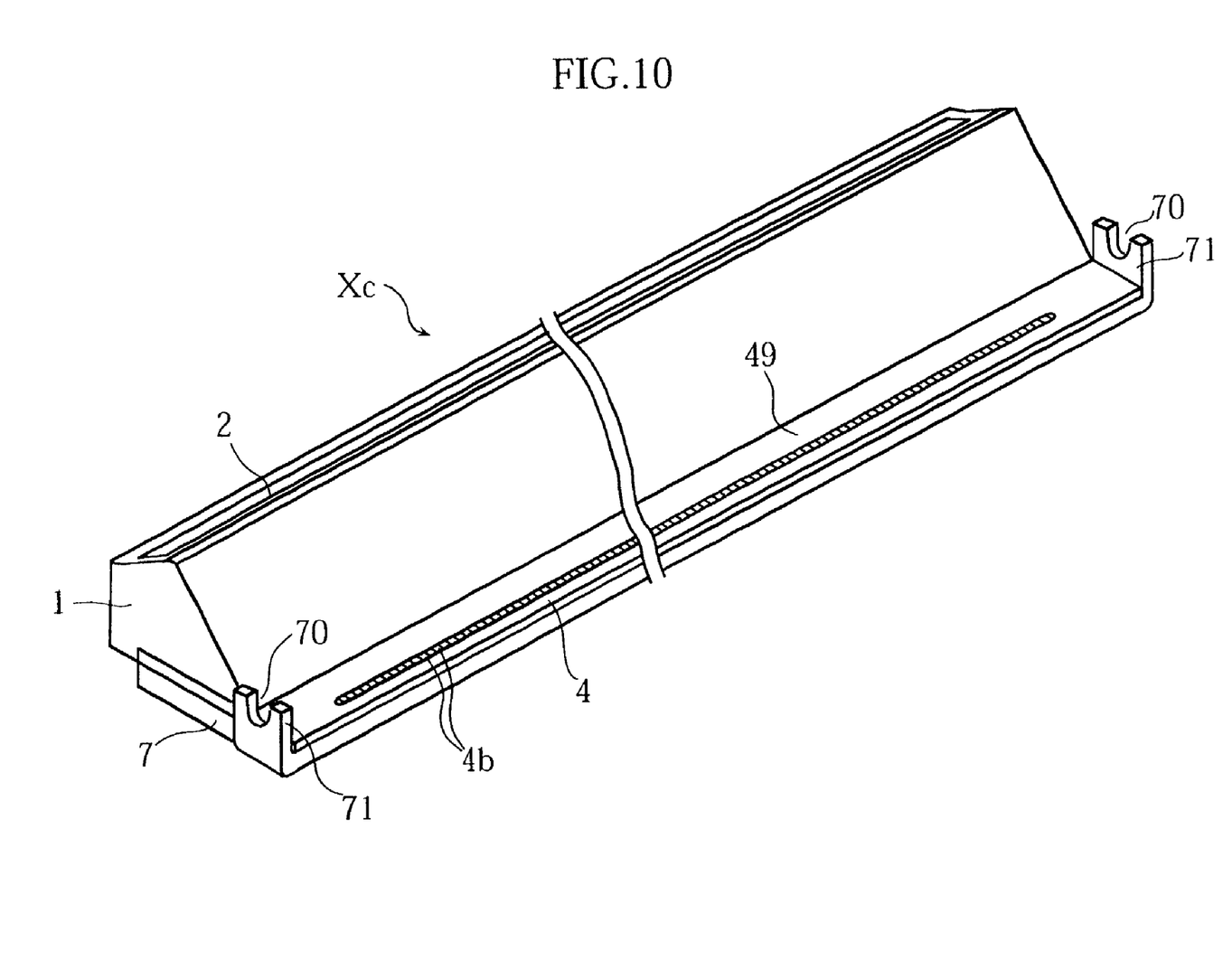
FIG. 10 is a perspective view of the image reading/writing head used in the wall-mounting image processing apparatus shown in FIG. 7.

As clearly shown in FIG. 10, the image reading/writing head Xc has a structure which is basically the same as that of the image reading/writing head X of the first embodiment, but differs therefrom in that a heat sink plate 7 is provided in contact with the reverse surface of the substrate 4. The heat sink plate 7 functions to allow heat generated at the heat generating elements 4b to dissipate to the outside, thereby stabilizing the temperature of the heat generating elements 4b. The heat sink plate may be made of a metal plate for example. The heat sink plate 7 is formed, at longitudinally opposite ends thereof, with a pair of stoppers 71 each of which is formed with a U-shaped recess 70. The stoppers 71 is integral with the heat sink plate 7 and may be formed by bending longitudinally opposite ends of the heat sink plate 7 for example. In the wall-mounting image processing apparatus Aa, when the second lid 97 is closed, the shaft of the recording paper platen roller $P_2$ is received in the recesses 70 for engagement with the paired stoppers 71, as shown in FIG. 8.

In the wall-mounting image processing apparatus Aa, the document platen roller $P_1$ and the recording paper platen roller $P_2$ are mounted to the reverse surfaces of the first and the second lids 96, 97, respectively, so that the apparatus Aa in which the platen rollers $P_1$, $P_2$ are provided has a relatively simple structure. Moreover, just by closing the first and the second lids 96, 97, it is possible to locate the platen rollers $P_1$ and $P_2$ at appropriate positions relative to the image reading/writing head Xc. Particularly, the engagement of the recording paper platen roller $P_2$ with the paired stoppers 71 of the image reading/writing head Xc defines the positional relationship between the recording paper platen roller $P_2$ and the image reading/writing head Xc. Therefore, it is possible to press the recording paper K against the heat generating elements 4b with an appropriate force. As shown in FIG. 8, the image reading/writing head Xc may be biased in the direction indicated by an arrow Nc by a spring 79 indicated by phantom lines. In such a case, the document platen roller $P_1$ and the recording paper platen roller $P_2$ can be pressed against the transparent cover 2 and the heat generating elements 4b, respectively, with an appropriate force.

Figure 9:
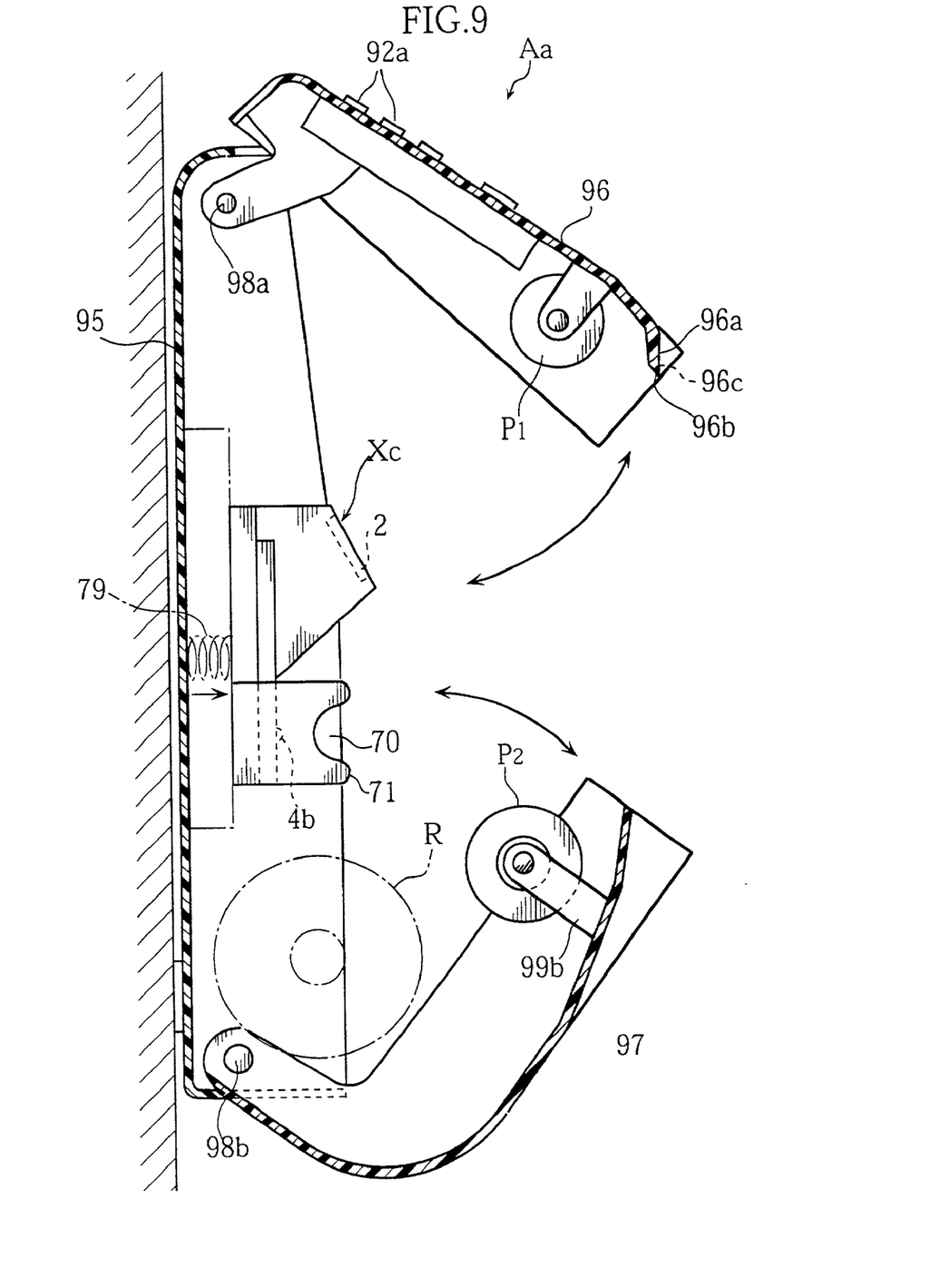
FIG. 9 is a sectional view of the wall-mounting image processing apparatus shown in FIG. 7 in which the the lids are opened.

When the document D is jammed in the document transfer path, the first lid 96 is opened to move the document platen roller $P_1$ far away from the transparent cover 2, as shown in FIG. 9. Thus, the jammed document can be easily removed. To open the first lid 96, fingertips of an user may be inserted into the discharge port 92e to grip the lower marginal portion 96a of the first lid 96, for example. At that time, the lower marginal portion 96a may be gripped at the longitudinally opposite ends 96c which are not sharply edged. When the recording paper K is jammed or when replacement of the paper roll R is necessary due to exhaustion of the recording paper K, the second lid 97 is opened to move the recording paper platen roller $P_2$ far away from the heat generating elements 4b.

In the wall-mounting image processing apparatus Aa, the document D and the recording paper K are discharged through the single discharge port 92e. Therefore, the structure of the apparatus is simpler and the appearance of the apparatus is neater than the apparatus in which two discharge ports are provided for the document and the recording paper. Particularly, the discharge port 92e can be easily formed because the clearance between the first lid 96 and the second lid 97 substantially serves as the discharge port 92e. To cut the strip-like recording paper K discharged through the discharge port 92e, the recording paper K is lifted up, as shown in FIG. 8, in the direction indicated by an arrow Nd, for contact with the cutting edge 96b and then pulled up. Since the cutting edge 96b is provided at a position corresponding to the upper edge of the discharge port 92e, it is possible, in cutting the recording paper K, to press a part of the recording paper K below the cutting edge 96b with fingertips. Therefore, the cutting operation can be appropriately performed.

The specific structure of each of the components in the wall-mounting image processing apparatus in accordance with the present invention is not limited to the embodiments described above, and may be modified in various ways.

For example, the light sources of the image reading/writing head incorporated in the machine housing need not be mounted on the substrate on which components such as the light receiving elements are mounted but may be disposed at another portion within the head case as are in the prior art shown shown in FIG. 11. Further, the light sources other than the LEDs may be employed.

The invention claimed is:

1. A wall-mounting image processing apparatus comprising a machine housing mounted on a substantially vertical wall surface, and an image reading/writing head disposed in the machine housing, the image reading/writing head including:
- a substrate having one surface on which a plurality of light receiving elements are arranged in a row;
- a head case mounted on said one surface of the substrate to surround the plurality of light receiving elements;
- a transparent cover mounted to the head case and spaced from the substrate in facing relation thereto, a document being transferred in contact with the cover;
- a light source disposed in the head case for illuminating the document;
- a plurality of lenses arranged in the head case for forming, on the plurality of light receiving elements, an image of the document illuminated by the light source; and
- a plurality of printing elements mounted on the substrate in a row extending in the same direction as the row of light receiving elements;
- wherein part of said one surface of the substrate forms an excess surface projecting laterally from the head case, and
- wherein the printing elements are arranged on the excess surface.

2. The wall-mounting image processing apparatus according to claim 1, wherein the transparent cover is so inclined that the spacing from the substrate increases toward the excess surface.

3. The wall-mounting image processing apparatus according to claim 1, wherein the head case has an outer side surface rising from said one surface of the substrate, at least part of the outer side surface being so inclined with respect to the substrate that it becomes farther from the excess surface as it rises from the substrate.

4. The wall-mounting image processing apparatus according to claim 1, wherein the plurality of lenses are inclined with respect to the substrate to be progressively farther from the excess surface as they extend toward the transparent cover.

5. The wall-mounting image processing apparatus according to claim 1, wherein each of the printing elements is a heat generating element, the apparatus further comprising a heat sink plate laid on a surface of the substrate opposite to said one surface.

6. The wall-mounting image processing apparatus according to claim 1, wherein the machine housing is provided with an engagement portion engageable with a catch member fixedly mounted on the wall surface.

7. The wall-mounting image processing apparatus according to claim 1, wherein the machine housing includes a front portion provided with at least one discharge port for discharging the document and a recording paper out of the machine housing as well as a plurality of operation switches, the plurality of operation switches being positioned above the discharge port when the machine housing is mounted to the wall surface.

8. The wall-mounting image processing apparatus according to claim 1, wherein the machine housing is integrally provided with a receiving portion for a recording paper, the receiving portion being offset in the machine housing to be located below a vertically central portion of the machine housing when the machine housing is mounted to the wall surface.

9. The wall-mounting image processing apparatus according to claim 1, wherein the machine housing comprises a main body integrally accommodating the image reading/writing head and having a front portion provided at least partially with an opening, and at least one cover for openably closing said opening, and wherein the cover is provided with a plurality of platen rollers for the document and the recording paper, whereby the plurality of platen rollers are opposed to the transparent cover and the plurality of printing elements, respectively, when the cover is closed.

10. The wall-mounting image processing apparatus according to claim 9, wherein the cover comprises a first lid which is provided with a platen roller for the document, and a second lid which is provided with a platen roller for the recording paper, the machine housing internally provides a document transfer path covered by the first lid and a recording paper transfer path covered by the second lid.

11. The wall-mounting image processing apparatus according to claim 10, wherein the machine housing comprises a document inserting port which is positioned above the transparent cover of the image reading/writing head when the machine housing is mounted to the wall surface, and a recording paper receiving portion which is positioned below the plurality of printing elements of the image reading/writing head when the machine housing is mounted to the wall surface.

12. The wall-mounting image processing apparatus according to claim 11, wherein a gap is formed between the first lid and the second lid, the gap serving as a common discharge port for the document and the recording paper.

13. The wall-mounting image processing apparatus according to claim 12, wherein the discharge port is provided with a cutting edge for the recording paper.

14. The wall-mounting image processing apparatus according to claim 13, wherein the cutting edge is formed at one side of the first lid which is oriented downward when the machine ho using is mounted to the the wall surface.

15. The wall-mounting image processing apparatus according to claim 14, wherein the cutting edge extends short of longitudinally opposite ends of said one side of the first lid.

16. The wall-mounting image processing apparatus according to claim 10, wherein the image reading/writing head is provided with a stopper which engages with a shaft of the recording paper platen roller when the second lid is closed.

* * * * *